United States Patent

[11] 3,576,978

[72] Inventor Jack Rosenberg
 Pacific Palisades, Calif.
[21] Appl. No. 728,685
[22] Filed May 13, 1968
[45] Patented May 4, 1971
[73] Assignee International Business Machines
 Corporation
 Armonk, N.Y.

[54] SYSTEM FOR ACCOMMODATING VARIOUS MACHINE TOOL RESOLUTIONS FROM A STANDARD PROGRAM
 10 Claims, 2 Drawing Figs.

[52] U.S. Cl. .................................. 235/151.11,
 340/172.5
[51] Int. Cl. ........................................ B23g 21/00,
 G06f 15/46
[50] Field of Search ............................ 235/151.11;
 340/172.5; 318/18 (20.100)

[56] References Cited
 UNITED STATES PATENTS
 3,069,608 12/1962 Forrester et al. ............... 318/18X
 3,390,315 6/1968 McDonough et al. ......... 235/151.11X
 3,430,036 2/1969 Patrick ........................ 235/151.11
 3,465,298 9/1969 La Duke et al. ............... 235/151.11X Primary Examiner—Malcolm A. Morrison
Assistant Examiner—Felix D. Gruber
Attorneys—Hanifin & Jancin and John L. Jackson ABSTRACT: A system for providing the correct number of pulses to drive any machine tool having a resolution of less than 0.001 inch from a standard program written for control of a machine tool having a resolution of 0.001 inch. Command words containing control bits for control of the various axes of a machine tool are stored in a computer memory and gated out under control of pulses provided by an oscillator. If a command word from the buffer of the computer memory is gated out each millisecond and the standard program is written for a machine tool having a 0.001 inch resolution, a maximum vector feedrate of 60 inches per minute can be provided. If the machine tool which is to be controlled has a resolution of $u$ inches and $m=0.001/u$ is an integer, which is the usual case, the frequency of the pulses as well as the number of pulses in the pulse train must be modified. An oscillator which produces $1,000\,m$ pulses per second is used to pulse a preset counter which is preset to $m$ and therefore, sends 1000 demand pulses per second to cause a new command word to be read from the computer memory every millisecond into an output buffer. The pulses from the oscillator are also fed directly to a transmission control device which gates the command word in the output buffer to the machine tool The result is that each command word is gated $m$ times to the machine tool. To position the machine tool cutter at the end of a cut with the actual resolution built into the machine tool, the preset counter is set to 1 when the distance from the end of the line segment being cut is less than 0.001 inch so that each of the command words is sampled only once.

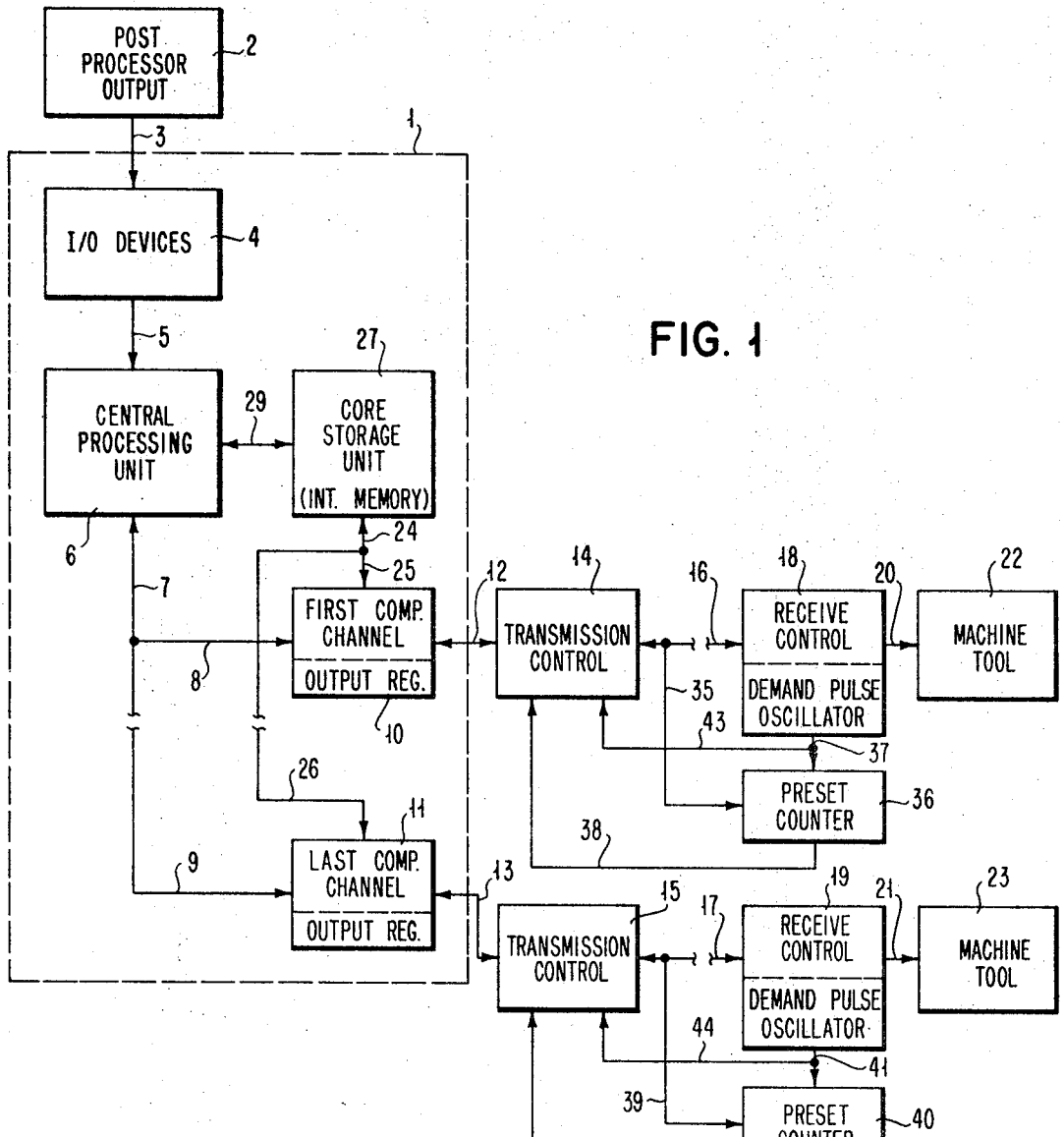

SYSTEM FOR ACCOMMODATING VARIOUS MACHINE TOOL RESOLUTIONS FROM A STANDARD PROGRAM

BACKGROUND OF INVENTION

1. Field of Invention

This invention relates to the control of machine tools and other precise mechanisms by computers in general and, more particularly, to a system which utilizes a standard 0.001-inch program for control of machine tools having resolutions smaller than 0.001 inch.

2. Discussion of Prior Art

In a patent application entitled "Demand Computer System for Machine Tool Control" by Jack Rosenberg, Royal H. Daw and David M. Bottles, assigned to the assignee of the present U.S. Pat. application, Ser. No. 697,849, there is described a system for controlling a machine tool in which a demand oscillator is used to gate previously calculated command words from a core storage unit to the servos of the machine tool. In this system the frequency of the demand oscillator is set such that if a one bit is contained in the same bit position of each command word, the machine tool will move at its maximum feedrate. That is, if a machine tool with a 0.001-inch resolution has a maximum vector feedrate of 60 inches per minute, it must receive a pulse every millisecond to drive at its maximum rate.

Obviously then, in the above briefly described system, there must be a command word stored in core for each pulse which is to be applied to the major axis. While this type of system has worked admirably in those applications where the resolution of a machine tool is fairly large as in the order of 0.001 inch, where the resolution of the machine tool is relatively small as, for instance, 0.0001 inch, an excessive amount of core is required and the loading of the processor is quite extensive.

Summary

Briefly, there is provided a system and method of providing the correct number of pulses to drive any machine tool having a resolution of $0.001/m$ (where $m$ is a positive integer), from a standard program written for control of a machine tool having a resolution of 0.001 inch.

If a command word from a computer memory is gated out each millisecond into an output buffer and transmitted to a machine tool having a 0.001-inch resolution, and the standard program is written for a machine tool having a 0.001-inch resolution, a maximum vector feedrate of 60 inches per minute can be provided. If, however, the machine tool which is to be controlled has a resolution of $u$ inches and $m=0.001/u$ is an integer, the frequency of the pulses as well as the number of pulses in the pulse stream must be modified. To accomplish this an oscillator which produces $1,000\ m$ pulses per second is used to gate the pulses from the output buffer to the machine tool servos at the rate of $1,000\ m$ pulses per second. A preset counter is preset to $m$ and, therefore, sends $1,000$ demand pulses per second to the computer to cause a new command word to be read from the computer memory every millisecond into the output buffer. The result is that each command word is gated $m$ times to the machine tool. Thus, the machine tool is driven at the proper vector feedrate without increasing the load on the central processing unit, i.e. the loading is reduced by a factor $m$ over what it would be if a new program were written using resolution $u$.

Although cutting accuracy is such that a resolution of 0.001 inch is acceptable during the cutting of a line segment, even though the machine tool has a finer resolution, it is desirable to have the capability of positioning the machine tool cutter at the end of the cut with the actual resolution built into the machine tool. This is achieved by resetting the preset counter to 1 when the distance from the end of the line segment being cut is less than 0.001 inch so that each command word is gated only once to the machine tool. The number of command words required for this terminal positioning is determined by the axis which must be moved the furthest distance during the terminal positioning.

BRIEF DESCRIPTION OF THE DRAWINGS

FIG. 1 is an overall block diagram illustrative of the subject control system utilizing a demand oscillator for each machine tool to be controlled which pulses a preset counter which in turn causes the transfer of command words for each machine tool into an output register and gates these command words to the associated machine tool; and FIG. 2 is a table illustrative of the operation of the system during terminal positioning.

DESCRIPTION OF THE PREFERRED EMBODIMENT

While the operation of the major part of the present system is shown and described in the aforementioned application by Bottles et al., for purposes of clarity, a portion of that system common to the subject system will be herein described.

The system of FIG. 1 is much like a conventional numerical control system as far as the part programmer is concerned. The part programmer describes a part to be cut and the manner in which the machine tool should proceed to cut it by writing a computer program using, for instance, the APT (Automatic Programmed Tool) language to produce a cutter location tape (CL tape). The cutter location tape contains the absolute coordinates of the centerline of the machine tool and the feedrate as it traverses the part being cut. A special post processor converts this information into a form and format required by the direct numerical control computer. As shown in FIG. 1, the post processor output 2 is inputted to the I/O devices 4 of the computer 1 a general purpose, digital computer with an internally stored program to control the performance of its component parts. The post processor output may be in the form of cards or magnetic tape. An example of the type computer 1 that may be utilized is the IBM 1800 computer system with peripheral devices as described in the following manuals: "1800 Function Characteristics Manual," IBM, Form No. A26–5918, 1956; "1800 Assembly Language Manual," IBM Form No. C26–5882, 1956; "1800 Fortran Language Manual," IBM, Form No. C26–3715, 1956; "1800 TSX Manual (Timesharing Executive)," IBM, 1956. The output is converted in the I/O devices 4 such as those described in "1800 Function Characteristics Manual" as referenced above, into electrical signals of suitable level for use by the central processing unit 6, and these electrical signals are applied along transmission line 5 to the CPU 6. An example of CPU 6 would be the IBM 1802 described in the "1800 Function Characteristics Manual" referenced above. Associated with the CPU 6 along transmission line 29 is a core storage unit 27. This is a conventional unit such as that used in the IBM 1800 as described in the "1800 Function Characteristics Manual" referenced above connected in a conventional manner to the CPU. The core storage unit 27 is connected along transmission lines 24 and 25 to a channel 10 and along transmission lines 24 and 26 to a channel 11. An example of the type channel that could be utilized is the computer channel used in the IBM 1800 which is specifically described in "Manual for RPQ C01–451, 2, 3, 4, 5; Channel Multiplexer for 1800," IBM, Form No. L26–2103, 1956. The channels 10 and 11 are operative to bring the contents of selected areas of the core storage unit 27 into their output registers. A channel 10 is connected along transmission lines 7 and 8 to the CPU 6 and channel 11 is connected along transmission lines 7 and 9 to the CPU 6. As illustrated in FIG. 1, there may be one or a number of channels. As will hereinafter become apparent, a channel is required for each machine tool to be controlled.

The operation of the CPU 6 and channels 10 and 11 to bring the contents of selected areas of the core storage unit 27 into the output registers of the channels is conventional. A more complete description of this operation can be found, for instance, in the IBM publications A26–5921, A26–5920 and A26–5918.

Channel 10 is connected along transmission line 12 to a transmission control unit 14 such as the transmission control unit used in the IBM 360 as described in "IBM System 360 I/O from Interface Channel to Control Unit," IBM, Form No.

A23-6843, 1964, which in turn is connected along transmission line 16 to a receive control unit 18 and along transmission line 35 to a preset counter 36 such as the Hewlett Packard 5214L. The receive control unit 18 which includes a demand pulse oscillator such as the IBM 2701 described in "IBM 2701 Parallel Data Adapter," IBM, Form No. A22-6844, 1964, is connected along transmission line 20 to the machine tool 22, along transmission line 37 to the preset counter 36 and along transmission line 43 to the transmission control 14. The output from the preset counter 36 is applied along transmission line 38 to the transmission control unit 14. Both lines 38 and 43 to transmission control 14 in the example of the IBM System 360 I/O are actually connected to the same input, but the signals are transferred thereon at different times as explained hereinafter. Similarly, the transmission control unit 15, which is associated with channel 11, is connected along transmission line 13 to channel 11, along transmission line 17 to the receive control unit 19 which includes the demand pulse oscillator such as the Hewlett Packard 212A Pulse Generator as described in Hewlett Packard Cat. No. 24, Apr. 1963, and along transmission line 44 to the output of the demand pulse oscillator. The transmission control unit is also connected along line 39 to the preset counter 40 which in turn is connected along transmission line 41 to the receive control unit 19. The output from the preset counter 40 is applied along transmission line 42 to the transmission control unit 15, while the control words received by the receive control unit 19 are transmitted along transmission line 21 to the associated machine tool 23. Examples of the types of machine tools 22, 23 that may be controlled include the Sunstrand Omni Mill and Gordon 230 Tape Master.

The transmission control units 14 and 15 perform three functions. First, they transmit pulses from the preset counters, which are driven by the demand pulse oscillators, to the computer channels to cause new words to be entered into the output registers of the channels from the output buffer tables of the core storage unit 27. Secondly, they gate the command words in the output registers to the receive control units and machine tools upon the receipt of a pulse from the associated demand pulse oscillator. Additionally, they amplify and shape the words received from the output registers for transmission to the receive control units. Again, the sequential entering of words from the core storage unit 27 into the channel under control of an externally generated pulse is well known and is described in the above referenced manuals. Briefly, however, the operation is as follows: each channel has two registers. The first register, a word counter register, will be loaded by the CPU with a number of words which the channel will read from core storage. A second register, the channel address register, will be loaded by the CPU with the first address in core storage that is to be read from core into the I/O register. The pulses from the preset counters which are applied to each channel are used to gate the address in the channel address register into the memory address register (not shown) of the core storage unit. Each time that the address from the channel address register is entered into the memory address register, the word count counter register is counted down and the address contained in the channel address register incremented (or decremented). When the word count register has been counted down to zero, any further transfer of the contents of the channel address register to the memory address register is inhibited. The CPU must then load a new address into the channel address register and a new count into the word count counter. Alternatively, a chaining process can be used which results in the automatic loading of these two registers without processor intervention.

In the above-referenced patent application there is described an interpolation technique in which a register is utilized for each axis of the machine tool to be controlled. Numbers dependent on the distance and velocity of each axis are added to the registers and the overflow from the registers used to control the insertion of one bits in each of the command words. With this technique the register associated with the axis which is to move the maximum distance during the cutting of a segment is incremented with a value $Q_{maj}$ which is equal to the fraction of the maximum feedrate of 60 inches per minute, then $$Q_x = .50, \quad Q_y = \frac{\Delta y}{\Delta x} = .50 \text{ and } Q_z = \frac{\Delta z}{\Delta x} = .25$$

Each of these $Q$ values is used to increment its associated register.

The above briefly described interpolation technique is included only to illustrate one method of loading computer words into a core storage unit to accomplish the driving of a machine tool. Other interpolation techniques or techniques for loading the command words are, of course, available.

In the following description it will become clear that to drive the machine tool in real time the computer must provide a command to the servo of each slide indicating either one increment of movement in the positive direction, one increment of movement in the negative direction, or no movement at all. The computer provides this information in the form of a command word in which two bit positions are reserved for each axis of the machine tool. A one or command bit, in the leftmost of these two positions will command a movement of one increment in the negative direction, while a one in the rightmost position will command a movement of the associated slide one increment in the positive direction. A zero in both positions indicates that no movement is commanded, while command bits in both positions are illegal.

As used herein, the resolution of the machine tool is the distance a slide moves upon receiving one electrical pulse to the servo.

As above indicated, the program or command word stored in the core storage unit for any machine tool, regardless of resolution, is calculated as if the machine tool had a resolution of 0.001 inch. If the machine tool which is to be controlled has a resolution of $u$ inches, and $m=0.001/u$ is an integer, the number $m$ is set into the preset counter and the demand oscillator which pulses the preset counter is set at 1,000 $m$ pulses per second. The preset counter for first external gating means will therefore send 1,000 demand pulses per second to the channel to cause a new command word to be read from the computer every millisecond into the channel. The transmission control unit which, as above indicated, not only acts to shape and level adjust the pulses received from the computer channel, but also acts to gate the pulses to the receive control unit, is pulsed at the rate of 1,000 $m$ by the Demand Pulse Oscillator or second external gating means and, therefore, will gate $m$ command words to the receive control unit for each word which appears in the channel.

For purposes of illustration of the subject invention, assume that the machine tool 22 is to be moved at a distance of $\Delta x = 1.0116$ and that the machine tool has a resolution of 0.0002 inch. In this example $m$ would equal 5 since $0.001/0.0002=5$. The CPU 6 would have loaded in its first command word, which is stored in the core storage unit 25, a word as shown at step 1 in FIG. 2. Thus, the right-hand position of the $x$ portion of the command word would contain a one or action bit and since $y$ and $z$ are not scheduled to move during this cut, they would contain zeros. The final three bits of the word which are the $m$ bits, are loaded with the binary number 5 (101).

While only the operation of the first computer channel 10 and associated machine tool 22 will be described, the operation of the other channels and their associated machine tools is identical. The first command word is brought from the core storage unit 27 into the first computer channel 10 along lines 24 and 25 and is placed in the output register 10. The first pulse from the demand oscillator in the receive control unit 18, which is applied along line 43 to the transmission control unit 14, causes the word to be gated from the output register of the channel 10 along line 16 to the receive control unit 18 and thence along line 20 to the machine tool 22. The $m$ bit portion of the word is directed along line 35 and is loaded into the preset counter 36 to load it with the number 5. The pulses from the demand pulse oscillator in the receive control unit 18 are then continuously applied along line 37 to the preset counter 36 which will then overflow at the rate of 1,000 pulses per second since the demand pulse oscillator is set at 5,000 pulses per second and these 1,000 pulses per second are applied through the transmission control unit 14 to the computer channel 10 to cause 1,000 new command words per second to be entered into the output register 10. However, each word appearing in the output register 10 is gated $m$ times from the output register through the transmission control unit 14 and receive control unit 18 to the machine tool 22 since the pulses from the demand pulse oscillator are applied along line 43 to the transmission control unit 14. Thus, each word which appears in the output register 10 will be gated five times to the associated machine tool 22.

To cause movement of 1.0116 inch in accordance with the present invention, 1,014 command words are required. This is determined as follows:

1 inch = 5,000 0.0002 inch pulses = 1,000 command words
0.01 inch = 50 0.0002 inch pulses = 10 command words
0.001 inch = 5 0.0002 inch pulses = 1 command word
0.006 inch = 3 0.002 inch pulses = 3 command words This is implemented as shown at FIG. 2. All of the command words contain 1's or action bits in the rightmost $x$ positions of the command words; however, to accomplish the final positioning the first 1,011 command words contain 5 in the $m$ bit positions while the 1,012th through the 1,014th contain 1's in the $m$ bit positions. The 1,015th again will contain a 5 to reset the system for the next cut. It will be seen from a consideration of the table of FIG. 2 that for the first 1,011 command words the transmission control unit will gate each of these command words five times since the preset counter is set to 5 and is thus dividing the output from the demand oscillator by 5, while the pulses from the demand oscillator are applied along line 43 to the transmission control unit 14 such that each word appearing therein is gated five times to the machine tool 22. For the final positioning, however, the 1,012th to the 1,014th command words are gated one time since the counter is set to one so that each command word appearing in the output register 10 is gated by the transmission control unit 14 to the machine tool only once. This is due to the fact that with the preset counter 36 set to 1, each pulse applied along line 37 from the demand oscillator causes a pulse to be applied along line 38 which in turn causes a new command word to be entered into the output register.

It will be obvious that in loading the final positioning command words the number required will be determined by the axis which has the greatest fraction to be moved which is less than the standard resolution.

While in the above-described system the $m$ numbers were carried in the command words, it will be obvious to those skilled in the art that they could be loaded directly from the computer.

In summary, an oscillator which produces 1,000 $m$ pulses per second is used to pulse a preset counter which is preset to $m$ and therefore, sends 1,000 demand pulses per second to cause a new command word to be read from the computer memory every millisecond into an output buffer. The pulses from the oscillator are also fed directly to a transmission control device which gates the command words in the output buffer to the machine tool. The result is that each command word is gated $m$ times to the machine tool. To position the machine tool cutter at the end of a cut with the actual resolution built into the machine tool, the preset counter is set to 1 when the distance from the end of the line segment being cut is less than 0.001 inch so that each of the command words is sampled only once.

While the output register which temporarily stores the command words brought through the channel from storage is included with the channel in the embodiment described, it will be obvious to one skilled in the art that the output register could reside in the receive control unit adjacent the machine tool. Locating the output buffer in the receive control unit would be desirable where the processor is located a significant distance from the machine tools. By doing this the data transmission rates between the channel and receive control unit would be reduced by a factor of $m$, thus alleviating signal to noise and bandwidth problems. If the output register is located in the receive control, the pulses from the demand oscillator would be then applied to gate the words $m$ times from the output register to the machine tool, but the pulses from the preset counter would still be applied to the channel to cause new command words to be brought from storage through the channel and transmitted to the output buffer in the receive control unit.

While the invention has been particularly shown and described with reference to a preferred embodiment thereof, it will be understood by those skilled in the art that various changes in the form and details may be made therein without departing from the spirit and scope of the invention.

I claim:

1. A system for providing a pulse train, in the form of a series of command words, to a machine tool to effect movement of the slides of said machine tool from input signals indicative of the length and velocity that each slide is to move during the cutting of a segment, said system comprising:
   a machine tool;
   a digital computer including a central processing unit, input means for receiving input signals, an output channel for transmitting command words to said machine tool, and a storage unit for storing said command words;
   said digital computer being responsive to said length and velocity signals and being programmed to generate a series of said command words for controlling a machine tool of standard resolution and to store said command words in output buffer tables in said storage unit;
   each of said command words having bit positions containing command bits for each slide in accordance with whether the command word is to effect movement of each slide;
   an output register in operable association with said channel to receive said command words from said storage unit;
   a first means external of said digital computer for causing said command words to be entered into said output register;
   said channel being operative to transfer command words from said output buffer tables of said storage unit into said output register under control of said first external means; and
   second means external of said digital computer for gating said command words from said output register to said machine tool.

2. The system of claim 1 further comprising means for allowing the said second external means to gate each of the command words entered into said output register at least twice to said machine tool when the major portion of said segment is being cut.

3. The system of claim 2 further comprising means to allow said second external means to gate to said machine tool only once those command words which require the distance to be cut on said segment to be less than standard resolution.

4. The system of claim 1 wherein first external gating means consists of a counter which is connected to and counts the output of a second external gating means and which generates overflow pulses to said channel to cause command words to be transferred from said output buffer tables into said output register,
   and second external means consists of an oscillator which is connected to and pulses said first external means and also provides gating means to gate command words from said output register to said machine tool.

5. The system of claim 4 wherein means are provided to set said oscillator at a predetermined frequency of 1,000 $m$ and said counter is preset with the predetermined number $m$ wherein $m$ is an integer and is calculated in accordance with the following formula:

$$m = \frac{\text{standard machine tool resolution}}{\text{resolution of machine tool to be controlled}}$$

6. The system of claim 5 wherein means are provided such that when the distance to be cut on said segment is less than said standard resolution, said preset counter is changed from said $m$ setting to 1.

7. The system of claim 6 wherein said central processing unit is programmed to calculate said counter settings and such setting of said counter is included as part of said command words.

8. A system for the control of a machine tool whose resolution is less than a standard resolution by a computer which is programmed for the control of a machine tool of standard resolution comprising:
- a digital computer which is receptive of length and velocity signals and programmed to generate a series of command words for controlling a machine tool of a standard resolution and to store said command words in a storage unit of said computer, said computer having a channel containing a transmission control unit;
- a machine tool whose resolution is smaller than said standard resolution;
- means between said machine tool and said computer for adapting the rate of transmission of command words from said computer storage unit to said machine tool at the proper rate for the said machine tool comprising;
- an oscillator connected to the transmission control unit of a channel of said computer, said oscillator gating the command from said machine tool; and
- a preset counter for counting the output of said oscillator and for generating overflow pulses when the counter exceeds its preset value, $m$, said counter gating command words from said computer storage unit to said transmission control unit.

9. The system of claim 8 wherein means are provided to set said oscillator at a predetermined frequency of 1,000 $m$ and said counter is preset with the predetermined number $m$ wherein $m$ is an integer and is calculated in accordance with the following formula:

$$m = \frac{\text{standard machine tool resolution}}{\text{resolution of machine tool to be controlled}}$$

10. The system of claim 9 wherein means are provided to change the setting of said preset counter from said $m$ setting to 1 when the distance to be cut on said segment is less than said standard resolution.